March 2, 1965  D. L. FERG  3,171,533

CHAIN LINK CONSTRUCTION

Filed June 22, 1962

Donald L. Ferg
INVENTOR.

BY *Eleanor A. O'Brien*
*and Harvey B. Jacobson*
Attorneys

United States Patent Office 3,171,533
Patented Mar. 2, 1965

3,171,533
CHAIN LINK CONSTRUCTION
Donald L. Ferg, Manawa, Wis.
Filed June 22, 1962, Ser. No. 204,354
2 Claims. (Cl. 198—176)

This invention relates to improvements in the construction of a conveyor chain utilized in material handling equipment.

The chain link construction of the present invention relates to the assembly of a series of chain links in end-to-end relationship, each link being of identical construction having a forwardly projecting end of reduced width adapted to be nested within the space between the clevis end of an adjacent link and connected thereto by a pin. It is therefore a primary object of the present invention to provide a chain link construction for chains of the type aforementioned so that a chain assembled therefrom will have greater flexibility.

In particular, the chain link construction of the present invention is concerned with gutter cleaner chains frequently employed for conveyor belts, the chain being propelled along a gutter surface to move and carry articles or material. In connection with such use, lateral and vertical flexibility of the chain is very important to the over-all design of the equipment restricted by the maximum degree of turning radius that can be allowed for a given amount of vertical travel. Thus, not only are the chain link bodies of the present invention capable of being pivotally displaced with respect to each other by a considerable amount about the connecting pin axes but also may be displaced with respect to each other transversely or in a plane parallel to the pivotal connecting axis at a 25 degree angle for example. Also, the chain link construction is such as to avoid development of restrictions on pivotal freedom due to corrosion and is also endowed with greater wear durability.

In accordance with the foregoing objects the chain link body construction of the present invention features a pivotal connection between adjacent links involving the rigid connection of the connecting pins between the clevis portions of the link body by either a force fit or by riveting. Turning of an adjacent link with respect to the non-rotating connecting pin is accommodated by a bearing bushing in bearing contact with non-binding bearing surfaces on the reduced nesting end of an adjacent link body. The chain link body also features the provision of a seating formation on the outside of one of the clevis portions for receiving thereon a material displacing paddle secured to the side of the clevis portion by a bolt assembly enclosed within a wear shoe element disposed in rearward relation to the material displacing paddle.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
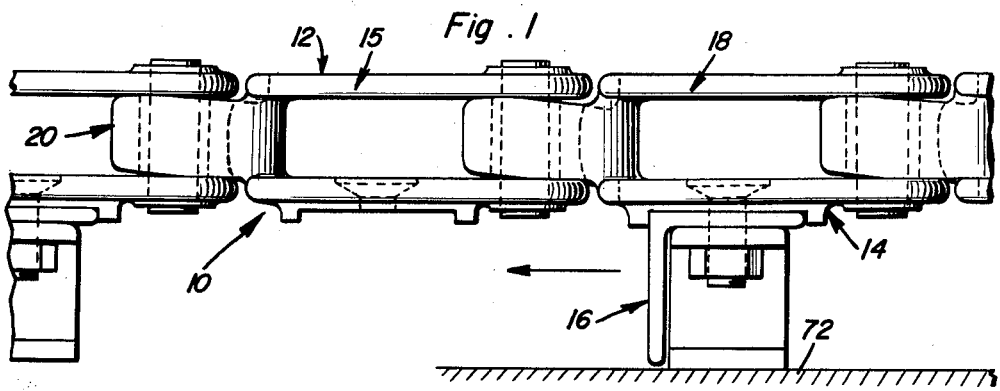
FIGURE 1 is a side elevational view of a portion of a conveyor chain constructed in accordance with the principles of the present invention.

Referring now to the drawings in detail, a conveyor or sprocket driven chain generally referred to by reference numeral 10 is shown, consisting of a series of interconnected chain link bodies of identical construction, each of the chain link bodies being generally referred to by reference numeral 12. It will therefore be observed that the top of the chain 10 forms a generally closed surface. Selected chain links at any desired interval have mounted on the bottom 14 thereof, a material displacing paddle assembly generally referred to by reference numeral 16. The substantially flat closed top portion of the chain is formed by adjacent top clevis portions 18 of the chain links 12, each link body being also provided with a forwardly projecting nesting portion 20 of reduced width. The nesting portion 20 of each link body is therefore adapted to be pivotally conected to the adjacent clevis bottom portion 14 and top clevis portion 18 of an adjacent link body.

Figure 3:
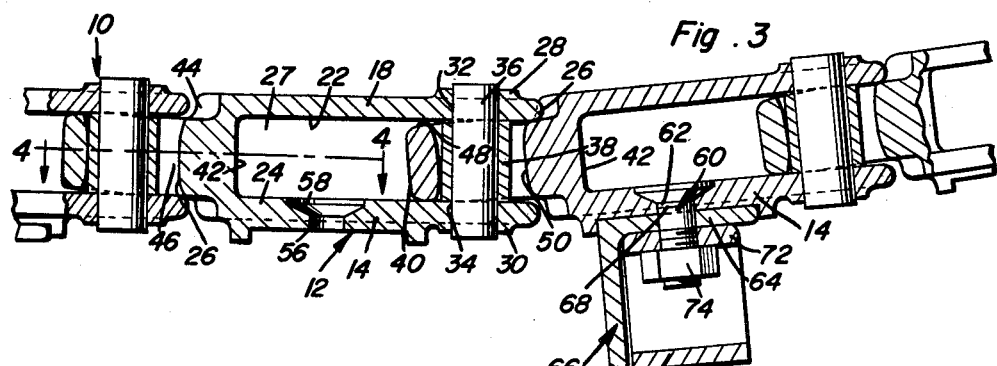
FIGURE 3 is a longitudinal side sectional view taken through a conveyor chain constructed in accordance with the present invention.
Figure 4:
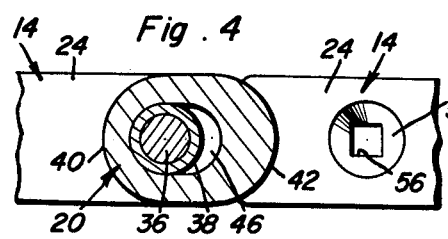
FIGURE 4 is a partial sectional view taken substantially through a plane indicated by the section line 4—4 in FIGURE 3.

Referring now to FIGURE 3 in particular, it will be observed that the top and bottom clevis portions 18 and 14 are disposed in parallel spaced relation to each other and have inner confronting faces 22 and 24 defining therebetween a sprocket tooth receiving space 27. The rear end of the clevis portions 14 and 18 are in the shape of rounded semi-circular or arcuate edges 26. The clevis portions adjacent the rear end edges 26 have boss formations 28 and 30 designed to equalize the strength of the clevis portion in view of the formation of aligned apertures 32 and 34 in the ends of the clevis portions through which the connecting pin 36 is received. The connecting pin is thereby rigidly secured to the clevis portions in bridging relation therebetween either by a force fit within the apertures 32 and 34 or by riveting of the connecting pin to the boss formations 28 and 30. Mounted about the connecting pin is a hard surface spacer bushing 38. The spacer bushing is adapted to provide a bearing surface for bearing and driving contact with the reduced nesting portion 20 of an adjacent link.

Each of the reduced nesting portions of the link bodies is disposed in overlapping relation to the clevis portions 14 and 18 and is formed integrally therewith between a semi-circular or arcuate forward end 40 and an oppositely curved arcuate rear end 42. Thus, the arcuate ends 42 and 40 of adjacent link bodies respectively present a driving surface and a trailing surface at the forward and rear end of the sprocket tooth receiving space 27. The reduced nesting portion 20 also extends rearwardly of the forward arcuate end shoulders 44 at which the clevis portions 14 and 18 terminate, the arcuate shoulders 44 being in parallel spaced relation to the rear arcuate edge 26 of an adjacent link body so as to accommodate pivotal and lateral displacement with respect to the pivotal axis through the connecting pin 36. Pivotal connection between the reduced nesting portions 20 and the rear ends of the clevis portions, is provided by means of an oblong hole 46 which axially extends between oppositely curved arcuate sides 48 of the reduced nesting portion 20. The arcuate sides 48 are in continuous bearing contact with both of or simultaneously with the confronting faces 22 and 24 of an adjacent link body to which the reduced nesting portion 20 is connected as seen in FIGURES 1 and 3. Accordingly, transverse or lateral displacement of one link body with respect to another is accommodated in a plane parallel to the connecting axis which extends through the connecting pin 36. It is for this reason, also, that the parallel spaced ends 26 and 44 are radially spaced from each other. Also, to facilitate the aforementioned transverse displacement between link bodies, the oblong hole 46 is chamfered on both axial sides as indicated by reference numeral 50 so as to reduce the contact surface area engaged by the spacer bushings 38.

Figure 2:
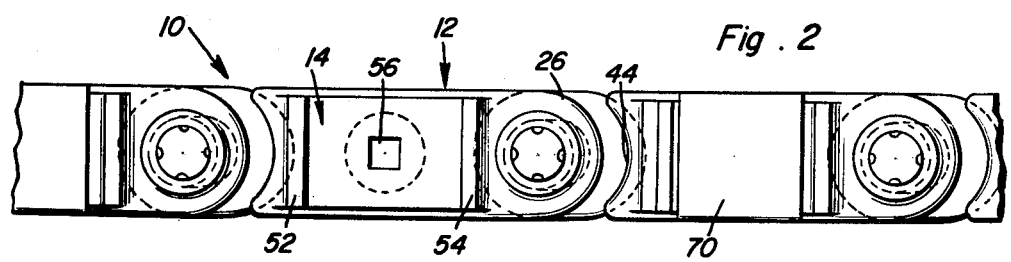
FIGURE 2 is a bottom plan view of the portion of the chain illustrated in FIGURE 1.

It will be observed that each of the bottom clevis portions 14 is provided with a pair of spaced projections 52 and 54 as more clearly seen in FIGURES 2 and 3, between which a seat is formed for the material displacing paddle assembly 16. A non-circular aperture 56 is therefore formed in the seat portion of the bottom clevis member 14 and communicates with a countersunk bore 58 for receiving a bolt 60 therethrough in order to fasten the paddle assembly to the bottom clevis member 14.

The bolt 60 therefore includes a non-circular portion 62 adapted to be received within the non-circular aperture 56 with the head of the bolt being received in the countersunk portion 58. The outwardly projecting threaded portion of the bolt is therefore received through an aperture formed in the leg portion 64 of a paddle element 66 having a forward material displacing face 68. Also mounted rearwardly of the displacing face 68, in enclosing relation to the bolt 60, is a wear shoe element 70 slidably supported on gutter surface 72 to compensate for the lateral unbalance applied to the chain by paddle assemblies and having an aperture through which the bolt 60 extends. The paddle element 66 and wear shoe element 70 are thus maintained in assembled relation fastened to the outside of the clevis member 14 by means of the nut 74 threadedly engaged on the threaded end of the bolt 60.

From the foregoing description, the utility and construction of the link bodies and chain will be apparent. It will therefore be appreciated that the link bodies are of a one-piece construction particularly suitable for casting. Each of the link bodies will be characterized by a reduced width nesting end 20 having flat parallel sides terminating in overlapping relation to arcuate shoulders 44 to accommodate turning in a plane parallel to the flat side. The rear arcuate edges of the reduced nesting portion of the link body overlaps the forward ends of the clevis portion to present therebetween a driving sprocket face 42 while the forward end of the reduced portion 20 presents a trailing face 40 rounded for easy release. The rear end portions of the clevis are also provided with outer strength equalizing bosses through which aligned apertures extend to receive the connecting pin with a force fit. The connecting pin which does not turn, is further sleeved by a hardened spacer 38 arranged to provide bearing and driving contact with the surfaces of the oblong hole 46. It will also be observed that the overlap between the reduced nesting portion 20 of the link body and spaced clevis portions 14 and 18 is sufficient to provide uniform strength throughout the link body. Also, the connection of the material displacing paddle assemblies at spaced intervals, is provided for by the link body construction, the material displacing element being assembled in a novel manner and being provided with wear shoe elements providing additional wearability.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A link chain construction for an endless conveyor chain in a material handling device comprising, a plurality of interconnected links, each link including a solid link body having a pair of rearwardly extending parallel spaced clevis portions, a forwardly projecting reduced width nesting portion to which said clevis portions are connected in overlapping relation, and a connecting pin nonrotatably secured to said clevis portions in bridging relation therebetween defining a relatively shiftable pivotal connection axis between said link body and a rearwardly adjacent link of said conveyor chain, each clevis portion of said parallel spaced clevis portions including arcuate edges at forward and rear ends thereof respectively and an aperture formed adjacent to said rear end edge to receive said connecting pin, said clevis portions having inner flat confronting faces for simultaneous bearing contact with a reduced nesting portion of the rearwardly adjacent link to define a sprocket tooth receiving space forwardly thereof, a material displacing element, one of said clevis portions includes an outer seat formation for receiving a material displacing element, bolt means for fastening said material displacing element to said one clevis portion and a wear shoe element assembled on the material displacing element in enclosing relation to the bolt means and in rearwardly disposed relation to the material displacing element.

2. The combination of claim 1 wherein said reduced nesting portion includes oppositely curved sides through which an oblong hole is formed, said curved sides being in continuous bearing contact with both of said clevis portions for accommodating transverse displacement of the link both in a plane parallel to said pivotal connecting axis and oppositely curved edges formed at forward and rear ends of the reduced nesting portion presenting driving and trailing surfaces, respectively, and a hard surface spacer bushing mounted on said connecting pin and extending through said oblong hole in the reduced nesting portion of said rearwardly adjacent link.

References Cited by the Examiner

UNITED STATES PATENTS

| | | | |
|---|---|---|---|
| 1,504,646 | 8/24 | Roddy | 198—175 |
| 1,731,393 | 10/29 | Paradise | 198—175 |
| 1,804,701 | 5/31 | Mojonnier | 198—189 |
| 1,841,592 | 1/32 | Edwards | 198—180 |
| 1,866,318 | 7/32 | Muhlenbruch | 74—248 |
| 2,544,191 | 3/51 | Tomfohrde | 198—171 |
| 2,687,651 | 8/54 | Webb | 74—250 |

SAMUEL F. COLEMAN, *Primary Examiner.*

WILLIAM B. LA BORDE, ERNEST A. FALLER, Jr.,
*Examiners.*